United States Patent
Geißel

(10) Patent No.: US 12,352,367 B2
(45) Date of Patent: Jul. 8, 2025

(54) CONTROL VALVE POSITION DETECTION

(71) Applicant: WOCO Industrietechnik GmbH, Bad Soden-Salmünster (DE)

(72) Inventor: Eberhard Geißel, Künzell (DE)

(73) Assignee: WOCO Industrietechnik GmbH, Bad Soden-Salmünster (DE)

( * ) Notice: Subject to any disclaimer, the term of this patent is extended or adjusted under 35 U.S.C. 154(b) by 0 days.

(21) Appl. No.: 17/480,435

(22) Filed: Sep. 21, 2021

(65) Prior Publication Data

US 2022/0090701 A1   Mar. 24, 2022

(30) Foreign Application Priority Data

Sep. 21, 2020   (DE) .......................... 102020124541.6

(51) Int. Cl.
*F16K 37/00* (2006.01)
*F16K 31/10* (2006.01)
*G01B 7/00* (2006.01)

(52) U.S. Cl.
CPC ........ *F16K 37/0041* (2013.01); *F16K 31/105* (2013.01); *G01B 7/003* (2013.01)

(58) Field of Classification Search
CPC ............. F16K 37/0041; F16K 37/0083; F16K 31/105; F16K 31/041; F16K 31/0603; F16K 11/0853; F16K 27/065; G01B 7/003
USPC .......................................................... 137/554
See application file for complete search history.

(56) References Cited

U.S. PATENT DOCUMENTS

| | | | | |
|---|---|---|---|---|
| 3,462,115 A | * | 8/1969 | Barker | F16K 31/0665 91/363 R |
| 4,891,975 A | * | 1/1990 | Charbonneau | F16K 37/0083 73/862.28 |
| 5,856,743 A | * | 1/1999 | Juniman | F16K 37/0041 137/554 |
| 6,220,284 B1 | * | 4/2001 | Hayashi | F15B 15/2807 137/554 |
| 6,263,915 B1 | * | 7/2001 | Hayashi | F15B 15/2861 137/554 |
| 6,957,801 B2 | * | 10/2005 | Wilfert | F16K 31/046 137/554 |
| 7,503,902 B2 | * | 3/2009 | Jensen | F16K 35/04 604/32 |
| 2013/0056658 A1 | | 3/2013 | Borchgrevink et al. | |
| 2016/0363236 A1 | * | 12/2016 | Smith | F16K 31/1635 |
| 2017/0362993 A1 | * | 12/2017 | Seo | F01P 11/14 |

FOREIGN PATENT DOCUMENTS

| | | |
|---|---|---|
| DE | 69130592 T2 | 5/1999 |
| DE | 102006009665 A1 | 4/2007 |
| DE | 60222780 T2 | 7/2008 |

(Continued)

OTHER PUBLICATIONS

Nov. 2, 2021 (DE) Office Action—App. 102020124541.6.
Feb. 17, 2022 (EP) Search Report—App. 21197226.0.

*Primary Examiner* — Craig M Schneider
*Assistant Examiner* — Andrew J Rost
(74) *Attorney, Agent, or Firm* — Banner & Witcoff Ltd.

(57) ABSTRACT

A method for detecting the position of an actuator includes adjustment of a control valve by an actuator. An actuator-characteristic operating variable may include a drive power, a drive operating force and/or a drive torque, and is detected continuously or discontinuously for determining the actuator position.

10 Claims, 2 Drawing Sheets

(56) References Cited

FOREIGN PATENT DOCUMENTS

| | | |
|---|---|---|
| EP | 1 529 937 B1 | 10/2004 |
| EP | 3153361 A1 | 4/2017 |
| JP | 2017194142 A | 10/2017 |
| JP | 2020008143 A | 1/2020 |
| WO | 03071109 A1 | 8/2003 |
| WO | 2019002490 A1 | 1/2019 |
| WO | 2020049214 A1 | 3/2020 |

* cited by examiner

CONTROL VALVE POSITION DETECTION

RELATED APPLICATION

This application claims the benefit and priority of German Patent Application DE 10 2020 124 541.6, filed Sep. 21, 2020, which is incorporated by reference herein in its entirety.

TECHNICAL FIELD

The present embodiments relate to detecting the position of an actuator of a control valve, which is adjustable by an actuator. A control valve position detection device is provided for a control valve, such as a directional control valve. The control valve adjusts a process fluid flow, such as in a motor vehicle.

BACKGROUND

Generic multi-port valves are used, for example, in cooling or air-conditioning circuits of vehicles for distributing or mixing fluids, such as cooling liquids or oils. In this context, a drive moves an actuator between a plurality of positions relative to a valve housing and/or a valve seat. It is known in the prior art to detect the position of the actuator. For example, the position of the actuator is detected as a linear distance to the valve seat or as a rotation angle with respect to the valve seat by means of sensors.

Such a multi-way valve for cooling circuits of a vehicle is described in EP1529937B1. The multi-way valve according to EP has a valve member in the form of a rotary piston, which can be adjusted relative to its axis of rotation by means of an electric motor in order to implement different valve positions. For position detection of the valve member, a Hall angle sensor is provided which is associated with a multi-pole permanent magnet. When the valve piston is moved, the Hall angle sensor registers an induced voltage which can be converted by a valve control into a rotational position of the valve member.

Hall angle sensors and the associated measuring sensor technology have basically proven their worth. However, particularly due to the ever-increasing cost pressure, the costs incurred with such a measuring device have proven to be disadvantageous both for the components as such and for the manufacture of control valves. Another disadvantage of such position sensors is the indirect position detection at an actuator rod associated with the actuator. Furthermore, position sensors tend to fail, which can lead to an unnoticed permanent malposition of the control valve.

SUMMARY

It is the object of the present embodiments to overcome the disadvantages of the prior art, and in particular to provide a more reliable and/or less expensive position detection of a control valve. This task is solved by the features of the independent claims. In one embodiment, a method includes detecting the position of an actuator of a control valve which is adjustable by an actuator, such as an electromagnetic actuator. Generic control valves may be connected to a fluid circuit of a motor vehicle, in one example.

In one embodiment, it can be an oil, water or air conditioning circuit of a motor vehicle, in particular in the engine area and/or in the battery area, in particular in motor vehicles operated by electric motors. The control valve serves to adjust, in particular to distribute, mix or shut off process fluids in the oil, water or air conditioning circuits, in particular of motor vehicles. Control valves of the type are actuated by an electromagnetic drive in order to be able to realize different operating states, i.e. valve positions of the actuator. The actuator may be a translationally movable reciprocating piston or a rotary piston movable relative to a rotational actuating axis.

According to the method according to one embodiment, an actuator-characteristic operating variable is detected continuously or discontinuously. The operating variable may, for example, be an actuator power, an actuator actuating force and/or an actuator torque. The operating variable may be detected continuously, i.e. continuously during operation of the control valve, and may be recorded, for example. Alternatively, it is possible for the operating variable to be detected at in particular predetermined intervals, cycle times or at predetermined actuator positions.

An actuator position is determined on the basis of the detected actuator-characteristic operating variable. As a result, it may be no longer necessary to install the Hall sensors and the associated measuring sensors used in the prior art, which simplifies manufacturing and reduces costs. Furthermore, the actuator position is determined directly. The detour via indirect position detection at a positioning rod of the actuator associated with the drive may no longer be necessary. In this respect, the method according to some embodiments for detecting the actuator position is significantly simplified and more accurate than in the prior art known to date. A further advantage of the method according to some embodiments is that it is possible to make use of the existing electronics of the actuator and/or of the control valve, without needing to use additional electronics. For example, the determination of the actuator position can be particularly advantageous and simple in that the actuator characteristics are known. For example, the actuator characteristics can be determined on the basis of a pre-initialization of the control valve and/or the actuator.

In one embodiment, an actuator position is monitored and/or a diagnosis of the actuator position is performed on the basis of the detected actuator-characteristic operating variable. For example, the monitoring and/or diagnosis of the actuator position may be integrated into an onboard diagnostic (OBD) system of, for example, the motor vehicle. In one embodiment, the approach of predetermined target actuator valve positions may be monitored and evaluated in this way. For example, a deviation of the actually determined actuator position from the target actuator position can be determined, monitored, and/or evaluated. The data communication may, for example, be carried out via LIN technology in one embodiment, wherein LIN 2.0 diagnostics, such as data dump service, may be used for diagnostics. For example, it may be communicated and/or monitored whether the actuator position is away from the target actuator position by an in particular predetermined threshold value. This may be done by comparing the detected actuator-characteristic operating variable with a target operating variable associated with the target actuator position, and identifying and monitoring a deviation based on the comparison. If the deviation is higher than 20%, in one example, this may be due to a faulty control valve. If necessary, measures can be directly initialized and/or initiated. In another embodiment, the monitoring and/or diagnosis is performed on the basis of a change in the actuator-characteristic operating variable. For example, it is possible to consider a change in the operating variable instead of or in addition to the respective current actual value. For example, an atypical change may indicate an atypical misbehavior of the control valve, which may mean that a change in the drive variable occurs by an amount that is too high or too frequently in a predetermined time interval. Threshold values can also be defined for this purpose, which, if exceeded, indicate a faulty control valve operating state.

In another embodiment, the actuator is moved relative to a valve housing of the control valve by the actuator and, at a predetermined position of the actuator relative to the valve housing, the actuator-characteristic operating variable is changed for a short time. The change may be substantially reversible in one embodiment. The short-term change may be understood to mean that there is a change in the operating variable over a predetermined period of time in the millisecond range, for the amount of a predetermined actuating angle in the case of a rotary actuator or for a predetermined axial actuating movement in the case of a reciprocating piston. For example, the change in operating variable may be detected and associated with an actuator position. For example, the detection of a change in the operating variable, in particular by a predetermined amount and/or a predetermined percentage, can be used to infer an actuator position based on the actuator characteristics.

According to another embodiment, the frictional resistance between the actuator and the control valve housing may be increased abruptly in the predetermined actuator position. The frictional resistance between the actuator and a valve seat cooperating with the actuator for closing and/or opening a fluid channel is increased. The seat may be formed integrally with the actuator housing. The abrupt increase in frictional resistance may be characterized in that the actuator force, actuator power and/or actuator torque required in the predetermined actuator position during the increased frictional resistance is significantly increased. For example, the necessary actuator power, actuator actuating force and/or actuator torque may be increased by at least 50%, in particular at least 100%, 150%, 200%, 250% or at least 300%.

According to another embodiment, which is combinable with the embodiments, a control valve position detection device is provided for a control valve. The control valve may be of a motor vehicle in one example.

The control valve has a drive which can be adjusted. The adjustment may be by an electromagnetic drive. Generic control valves are connected to a fluid circuit of a motor vehicle, for example. For example, it may be an oil, water or air conditioning circuit of a motor vehicle, in particular in the engine area and/or in the battery area, in particular in motor vehicles operated by electric motors. The control valve serves to adjust, in particular to distribute, mix or shut off process fluids in the oil, water or air conditioning circuits, in particular of motor vehicles. Generic control valves are actuated by an electromagnetic drive in order to realize different operating states, i.e. valve positions of the actuator. The actuator may be a translationally movable reciprocating piston or a rotary piston movable relative to a rotational actuating axis.

The control valve position detection device according to some embodiments comprises electronics which are configured to detect a position of the actuator on the basis of an actuator-characteristic operating variable, such as a drive power, a drive actuating force and/or a drive torque. The electronics, may for example be electronics of the actuator and/or the control valve. Furthermore, the electronics may be coupled to or integrated with the onboard diagnostic system of the motor vehicle. Accordingly, it is also possible for the control valve position detection device, according to some embodiments, to access or revert to the electronics of other components, such as the control valve or the actuator, without the need for further electronics. For example, the monitoring and/or diagnosis of the actuator position may be integrated into an onboard diagnostic (OBD) system of, for example, the motor vehicle. For example, the approach of predetermined target actuator valve positions may be monitored and evaluated. For example, a deviation of the actually determined actuator position from the target actuator position can be determined, monitored and/or evaluated. The data communication may, for example, be carried out via LIN technology in one embodiment, wherein LIN 2.0 diagnostics, such as data dump service, may be used for diagnostics. In some embodiments, it may be communicated and/or monitored whether the actuator position is away from the target actuator position by a predetermined threshold value. This may be done by comparing the detected actuator-characteristic operating variable with a target operating variable associated with the target actuator position, and identifying and monitoring a deviation based on the comparison. If the deviation is higher than 20%, for example, this may be due to a faulty control valve. If necessary, measures can be directly initialized and/or initiated. In another embodiment, the monitoring and/or diagnosis is performed on the basis of a change in the actuator-characteristic operating variable. For example, it is possible to consider a change in the operating variable instead of or in addition to the respective current actual value. For example, an atypical change may indicate an atypical misbehavior of the control valve. For example, this may mean that a change in the drive variable occurs by an amount that is too high or too frequent in a predetermined time interval. Threshold values can also be defined for this purpose, which, if exceeded, indicate a faulty control valve operating state.

In another embodiment of the actuator valve position detection device, the actuator valve position detection device includes a valve housing side position detection auxiliary and/or an actuator-side position detector, configured to cause a momentary change in the actuator-characteristic operating variable. For example, the change may be substantially reversible. The short-term change may be understood to mean that a change in the operating variable is recorded over a predetermined period of time in the millisecond range, for the amount of a predetermined actuating angle in the case of a rotary actuator or for a predetermined axial actuating movement in the example of a reciprocating piston. The change in operating variable may be detected and associated with an actuator position. For example, the detection of a change in the operating variable by a predetermined amount and/or a predetermined percentage, may be used to infer an actuator position in knowledge of the actuator characteristics. The detector or auxiliary may be formed by structural features and may be associated with or arranged on the actuator and/or the valve body, in particular a valve seat cooperating with the actuator for opening and/or releasing a fluid channel of the control valve. The detector or auxiliary can have a predetermined, fixed position on the actuator and/or the control valve housing, in particular, the valve seat.

In another embodiment of the control valve position detection device, the detector or auxiliary are capable of generating a short-term resistance peak against a relative displacement of the actuator and the valve housing, so that the actuator-characteristic operating variable changes abruptly, or increases in one example. For example, there may be a generating of an abrupt increase in frictional resistance such that the actuator-characteristic operating variable increases abruptly. In an alternative embodiment, it is also conceivable to have a configuration to bring about an abrupt reduction in the operating variable, including an abrupt reduction in the frictional resistance. For example, locally, at predetermined, fixed positions on the actuator and/or the valve housing, in particular the valve seat, coatings or inserts can be used which have a reduced coefficient of sliding friction with respect to the valve member, valve housing and/or valve seat. When actuating the actuator by the drive, the drive applies a certain drive power, drive actuating force and/or drive torque which results in a certain movement, for example rotation or translation, of the actuator to adjust it which thereby adjusts the process fluid flow. Thus, when at a predetermined position with respect to the actuator valve and a momentary resistance peak can be produced, such as an increase or decrease in frictional resistance, there is a momentary, abrupt change in an actuator-characteristic operating variable, such as the drive power, drive actuation force and/or drive torque. This change may be detected, monitored, evaluated or otherwise processed by the electronics, for example the drive electronics. Based on the knowledge of the position of the means (e.g. detector(s) and/or auxiliaries) and in knowledge of the actuator characteristic via a predetermined change of an actuator-characteristic operating variable, it is possible to infer the position of the actuator with respect to the valve housing, i.e. an opening and/or closing degree of the control valve.

In another embodiment of the control valve position detection device, there may be a position detection auxiliary arranged on a valve housing defining a fluid channel, and a position detector arranged on the actuator, in particular in a rotationally fixed manner. The position detector and the position detection auxiliary cooperate such that the control valve position detector generates a position signal. For example, the position detection auxiliary are arranged on a valve seat of the valve housing cooperating with the actuator for closing and opening the fluid channel. In another embodiment, the position detection auxiliary and the position detector are arranged and coordinated to each other to engage with each other at a predetermined position of the actuator relative to the valve housing, whereby a position signal indicative of the actuator position is generated by the control valve position detector.

Further, the position detection auxiliary and the position detector may be configured to form a frictional contact upon movement of the actuator relative to the valve body, causing a momentary peak in resistance against the relative movement. In one embodiment, an abrupt increase in frictional resistance may be produced. It is possible that the position detection auxiliary is formed by a protrusion from a valve housing inner side, and the position detector is formed by a protrusion protruding from an outer side of an actuator. In this embodiment, the position detection auxiliary is made of a softer material than the position detector. For example, the position detection auxiliary and/or the position detector may be made of plastic in one embodiment.

In some embodiments, at least one of position detection auxiliary and position detector is designed in such a way that instead of a short-term resistance peak (e.g. a sudden increase in the frictional resistance), a short-term sudden reduction in the frictional resistance between the actuator and the valve housing is achieved. At least one of a position detection aid and the position detector may be provided with a friction reducing coating or be made of a material having very low coefficients of sliding friction. In some embodiments, at least two position detectors are provided spaced apart along a direction of movement of the actuator relative to the valve body. The plurality of position detectors may be spaced apart from one another in the circumferential direction with respect to a rotational actuating axis in the case of a rotary piston actuator, or in the axial direction with respect to a translational axis in the case of a reciprocating piston actuator. The distance between two adjacent position detectors may correspond to a predetermined increment of movement of the actuator, in particular when the actuator comprises a stepper motor.

In another embodiment of the actuator position detection device, the electronics are arranged to monitor the position of the actuator and/or are coupled to monitoring electronics. For example, the monitoring and/or diagnosis of the actuator position may be integrated into an onboard diagnostic (OBD) system, such as in a motor vehicle in one example. The approaching of predetermined target actuator valve positions can be monitored and evaluated. For example, a deviation of the actually determined actuator position from the target actuator position can be determined, monitored, and/or evaluated. The data communication may be carried out via LIN technology in one embodiment, wherein LIN 2.0 diagnostics, such as data dump service, may be used for diagnostics. In one embodiment, it may be communicated and/or monitored whether the actuator position is away from the target actuator position by a predetermined threshold value. This may be done by comparing the detected actuator-characteristic operating variable with a target operating variable associated with the target actuator position, and identifying and monitoring a deviation based on the comparison. If the deviation is higher than 20% in one example, this may be due to a faulty control valve. Measures may then be directly initialized and/or initiated. In another embodiment, the monitoring and/or diagnosis is performed on the basis of a change in the actuator-characteristic operating variable. It is possible to consider a change in the operating variable instead of or in addition to the respective current actual value. For example, an atypical change may indicate an atypical misbehavior of the control valve. For example, this may mean that a change in the actuator variable occurs by an amount that is too high or too frequent in a predetermined time interval. Threshold values can also be defined, which, if exceeded, indicate a faulty control valve operating state.

According to another embodiment, which is combinable with the preceding embodiments, a directional control valve, such as a 3/2 or a 4/2 directional control valve, is provided for adjusting a process fluid flow of a motor vehicle in one example. Generic control valves are connected to a fluid circuit of a motor vehicle in one example. In some embodiments, it may be an oil, water or air conditioning circuit of a motor vehicle, such as in the engine area and/or in the battery area of motor vehicles operated by electric motors. The control valve serves to adjust, and to distribute, mix or shut off process fluids in the oil, water or air conditioning circuits. Generic control valves are actuated by an electromagnetic drive in order to be able to realize different operating states, i.e. valve positions of the actuator. The actuator may be a translationally movable reciprocating piston or a rotary piston movable relative to a rotational actuating axis.

The control valve according to one embodiment comprises at least one fluid channel. The fluid channel may be delimited by a valve housing. Furthermore, the fluid channel may be delimited in sections by fluid connection pieces, for example a fluid inlet piece and a fluid outlet piece. Viewed in the direction of flow, a valve space can be located between the fluid inlet connection piece and the fluid outlet connection piece, in which a distribution, mixing, shut-off or the like of the process fluid flow can take place.

The control valve according to the detection may include an actuator for closing and at least partially opening the fluid channel. The actuator may be located in the valve chamber. In one embodiment, the actuator can be an actuator that can be rotated with respect to a rotational actuation axis, a so-called rotary piston, or an actuator can be moved along an axial translational actuation axis, such as with a lifting piston. Furthermore, the control valve may include a drive, such as an electromagnetic drive, coupled to the final control element for applying positioning forces. The actuator may include electronics. In one embodiment, the drive serves to generate a drive power, a drive actuating force, and/or a drive torque in order to set or move the actuator for opening and closing the fluid channel.

The control valve according to one embodiment further includes a control valve position detection device configured according to one of the embodiments described above. This provides a control valve that is easy to implement and has a simply implemented and precise control valve position detection device. The advantages described with respect to the method according to the invention or the control valve position detection device according to the embodiments result analogously for the control valve according to the invention.

In one embodiment of the control valve, the control valve further comprises a valve housing at least partially defining the fluid channel. A position detection auxiliary is arranged on the valve housing, which is set up to cooperate with a position detector associated with the control member, which may be arranged on the control member and/or connected to the control member in a rotationally fixed manner. The control valve position detection device may generate a position signal. The control valve position detector may be arranged to generate the position signal when the position detection auxiliary and the position detector detect each other optically or haptically in some embodiments. The position detection auxiliary may be arranged at a valve seat cooperating with the actuator for closing and opening the fluid channel. In this way, the association of the position detector and the position detection auxiliary is ensured.

In another embodiment of the control valve, the position detection auxiliary and the position detector are arranged and coordinated with each other in such a way that they come into engagement with each other at a predetermined position of the actuator relative to the valve housing, whereby a position signal indicating the actuator position is generated by the control valve position detector. To engage with each other, the position detection auxiliary and the position detector may pass over each other, slide along each other, or abut each other in some embodiments, during actuator movement. The engagement between the position detection auxiliary and the position detector may define a predetermined actuator position relative to the valve body.

According to another embodiment of the control valve, the position detection auxiliary and the position detector are configured to form a frictional contact during a movement, in particular rotation or translation, of the actuator relative to the valve housing, which causes a short-term resistance peak against the relative movement of the actuator and the valve housing. For example, the resistance peak may cause an abrupt increase in frictional resistance. Alternatively, the frictional contact may be configured to reduce momentary, abrupt frictional resistance between the actuator and the valve housing, in particular the valve seat. This can be realized, for example, by a lower coefficient of sliding friction provided or existing at position detection aids and/or position detector(s).

In another embodiment of the control valve, the position detection auxiliary is formed by a projection, such as a nub, projecting from the valve housing inner side and/or the position detection auxiliary is formed by a projection, such as a nub, projecting from an actuator outer side. The projections may be separate components and/or may be made in one piece with the valve body and/or the actuator. The projections represent a structurally simple way of establishing an engagement between valve housing-side position detector and actuator-side position detector.

In another embodiment of the control valve, it may be provided that the position detection auxiliary is made of a softer material than the position detector. For example, a measure of the softness of the material may be its modulus of elasticity. The materials of the position detection auxiliary and position detector may be selected such that, while achieving the desired short-term, abrupt change in the actuator-characteristic operating variable, the operation of the actuator is not affected and the position detection auxiliary and position detector do not adversely affect the efficiency of the actuator and/or the control quality of the control valve. For example, position detection auxiliary and/or position detector may be made of plastic.

According to another embodiment of the control valve, the control valve includes at least two position detectors and/or position detection auxiliary arranged at a distance from each other along a direction of movement of the actuator relative to the valve housing. The position detector and/or the position detection auxiliary may be spaced apart from each other in the circumferential direction with respect to an axis of rotation or in the axial direction with respect to an axis of translation, depending on whether the piston is a rotary piston or a reciprocating piston. For example, the distance between two adjacent detectors or auxiliaries is uniformly distributed in the circumferential direction or in the axial direction, respectively. The distance may be predetermined. It is possible that the distance between two adjacent position detectors or two adjacent position detection auxiliaries corresponds to a predetermined movement increment of the actuator. This may be advantageous if the drive is a stepper motor.

BRIEF DESCRIPTION OF THE DRAWINGS

In the following, further properties, features and advantages of the invention will become apparent by means of a description of preferred embodiments of the invention with reference to the accompanying exemplary drawings, which show.

DETAILED DESCRIPTION

Figure 1:
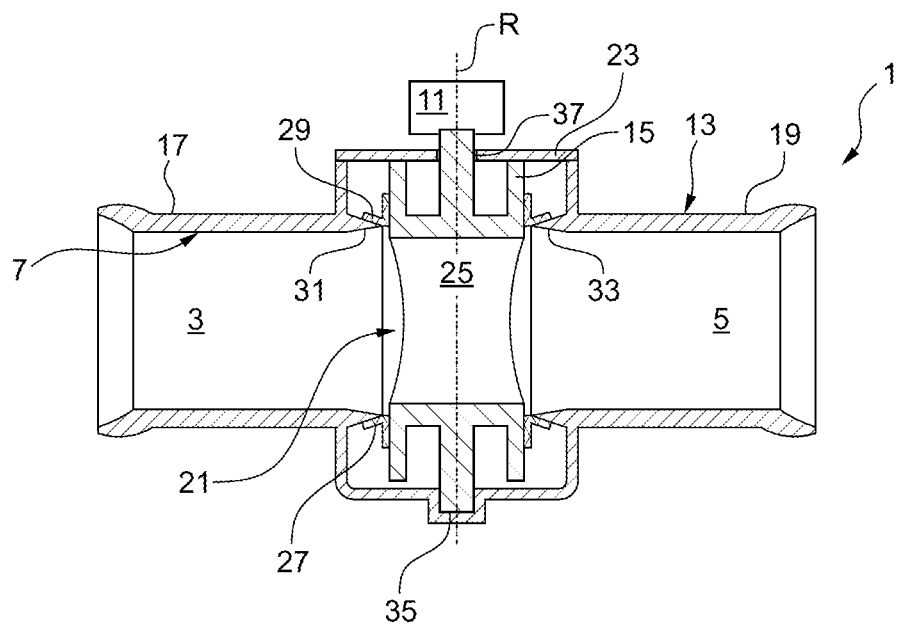
FIG. 1 is a schematic sectional view of a control valve according to one embodiment.

In the present description of embodiments of the present invention with reference to the accompanying figures, a control valve for adjusting a process fluid flow, for example of a motor vehicle, is provided with reference numeral 1.

Figure 3:
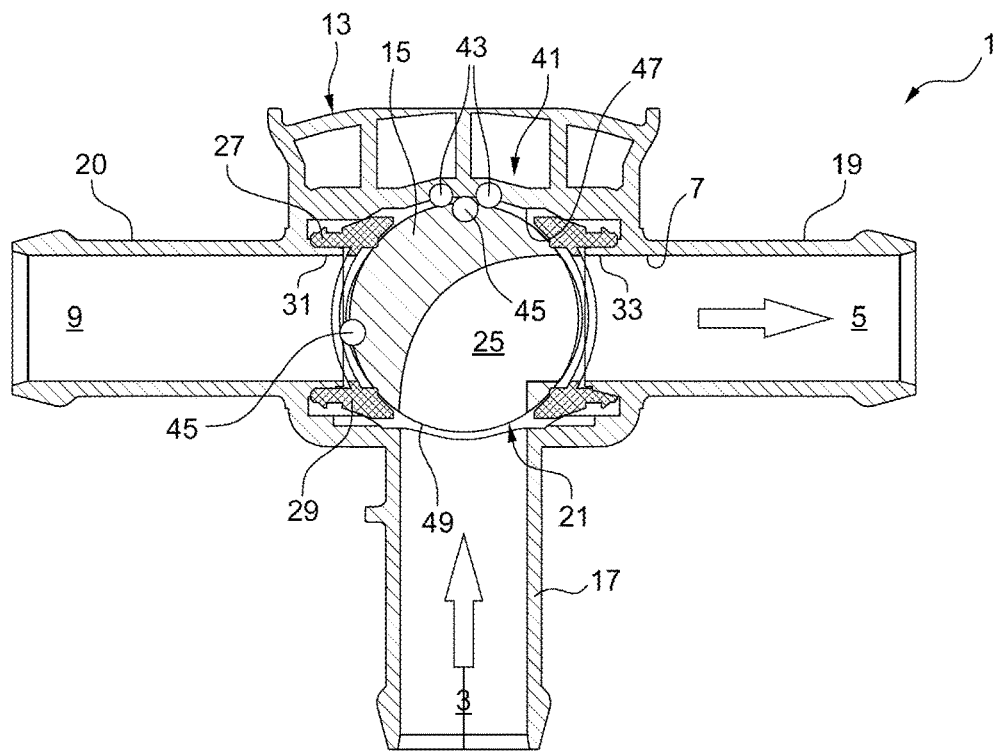
FIG. 3 is a schematic sectional view of one embodiment of a control valve in a first actuator position.
Figure 4:
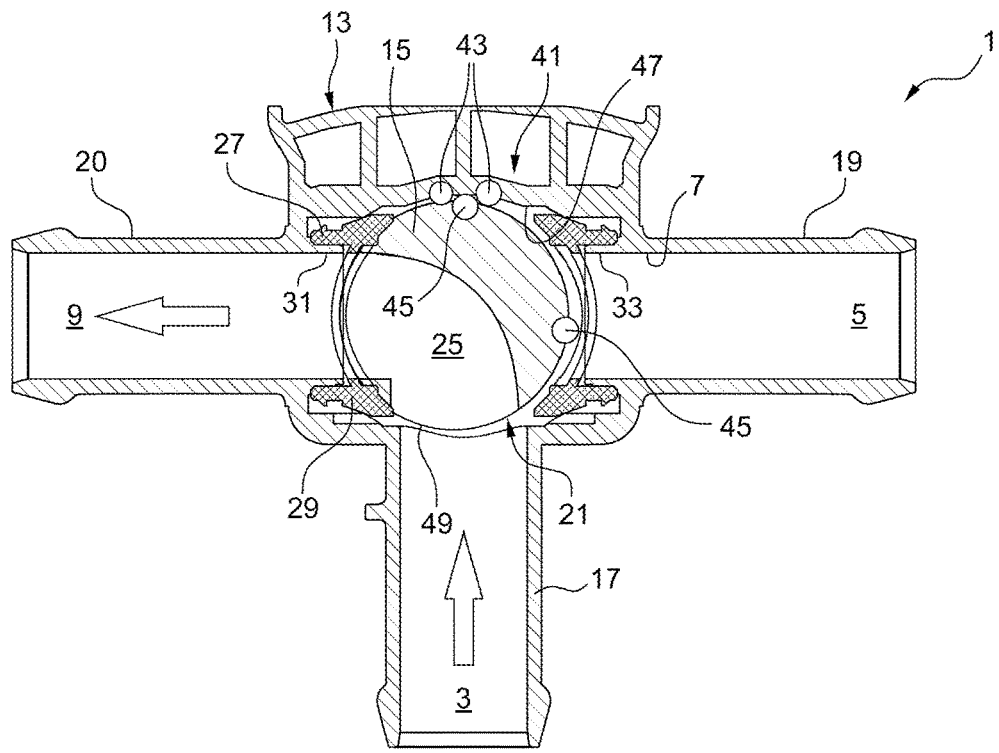
FIG. 4 is the actuator according to FIG. 3 in a second actuator position.

Generic control valves 1 are used, for example, for thermal management in motor vehicles and serve, for example, to distribute, mix and/or shut off process fluids, such as oils, water and/or coolants. The control valve 1 shown in FIG. 1 may be, for example, a shut-off valve 1 with a fluid inlet 3 in a fluid outlet 5 or a directional control valve, in particular a multi-way valve, such as a 3/2 or 4/3 multi-way valve, in which only one fluid channel 7 is shown. For example, the control valve 1 according to the invention illustrated in FIGS. 3 and 4 is a 3/2 multi-way valve with a fluid inlet 3 and two fluid outlets 5, 9. By the control valve 1, which can also be referred to as fluid valve 1, fluid flows can be distributed, mixed, shut off and/or adjusted, for example in order to implement the thermal management of the motor vehicle.

A control valve 1 includes the following components in one embodiment: a drive 11, in particular an electromagnetic drive, for applying actuating forces; at least one fluid channel 7 delimited by a valve housing 13; an actuator 15 for closing and at least partially opening the fluid channel 7; and a control valve position detection device according to the invention, which will be discussed in more detail with reference to FIGS. 2 to 4.

The valve housing 13 comprises a fluid inlet port 17 defining the fluid inlet 3 and a fluid outlet port 19 defining the fluid outlet 5 for connection to a piping system, for example of a motor vehicle, such as a cooling, oil or heating system. The nozzles 17, 19 are formed as hollow cylindrical pipe sections and extend along a common longitudinal axis. Viewed in the direction of flow, a valve space 21 is located between the fluid inlet port 17 and the fluid outlet port 19, which constitutes the area inside the valve housing 13 in which the actuator 15 can move during an actuating movement. The valve housing 13 is firmly and, for example, materially closed by a cover 23.

For example, the control valve 1 serves to adjust a process fluid flow entering via the fluid inlet port 17, such as a coolant flow, i.e. to adjust a fluid volume, in particular coolant volume, exiting via the fluid outlet port 19 of the control valve 1. For example, the control valve can open, close or partially open the full flow cross-section within the valve chamber 21, depending on the need or setting, which can be made for example by a higher-level control electronics, such as a motor vehicle electronics.

The valve chamber 21 contains the actuator 15 which, according to FIGS. 1 to 4, is designed as a rotary piston and can be adjusted, in particular rotated, about a rotation axis R, in particular a rotation adjustment axis, in order to implement various flow scenarios. The actuator 15 is set via the schematically indicated actuator 11, which is for example an electromagnetic actuator and/or has electronics, in particular actuating and/or control electronics. The actuator 15 has a bore 25 which is aligned to allow fluid flow through the control valve 1 with respect to a fluid channel 7 bounded by the valve body 13. The fluid channel 7 according to FIG. 1 is formed in the open valve position by the tubular fluid inlet port 17, the tubular fluid outlet port 19 and the inner bore 25 of the actuator 15.

One or more seals 27, 29 may be arranged between the actuator 15 and the valve housing 13 to ensure tightness in the closed position. For example, the seals 27, 29 are arranged in the region of a valve seat 31, 33 of the valve housing 13 which cooperates with the actuator 15 for closing and in particular opening the fluid channel 7.

In FIG. 1, the rotary piston actuator 15 is rotatably mounted with respect to the valve housing 13 in order to be able to rotate about the axis of rotation R in order to adjust different flow scenarios. The rotationally movable mounting is implemented via rotational bearings 35, 37, through which the axis of rotation R passes. In the embodiment of FIG. 1, at least in the opened valve member state, the rotational bearings, in particular radial bearings, are located in the fluid area and are flowed around or flushed by the fluid flow, so that a reliable, in particular permanent, lubrication of the bearings 35, 37 is accomplished. The bearing arrangements 35, 37 are implemented, for example, by journal recess engagement structures.

Figure 2:
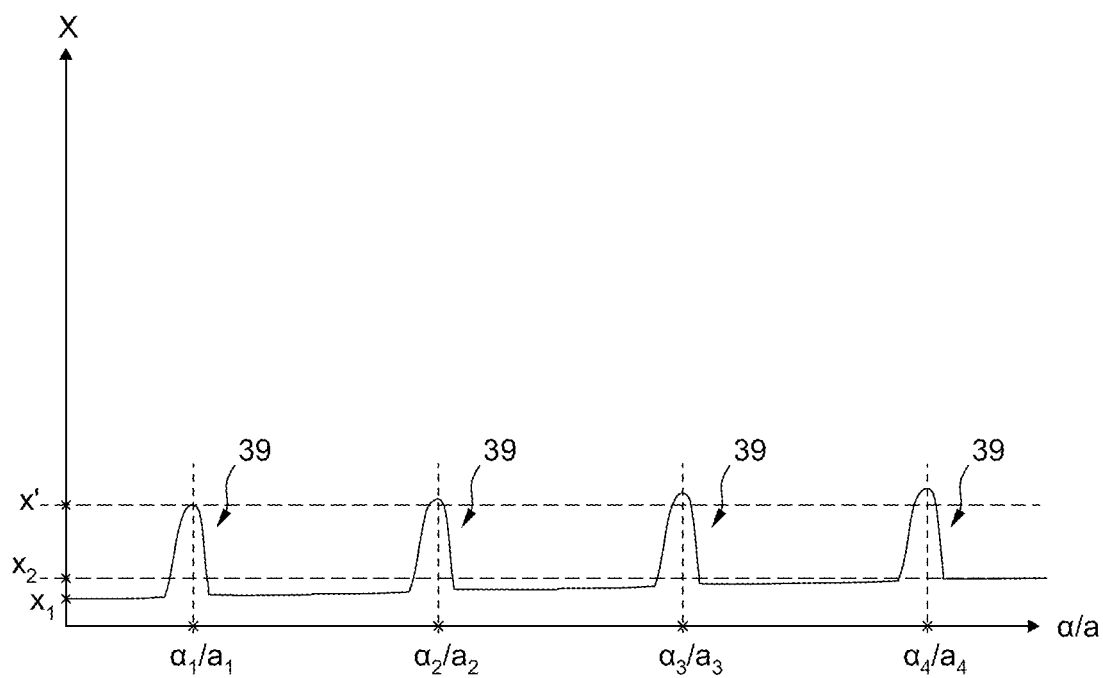
FIG. 2 is a schematic diagram illustrating the operation of one embodiment.

Referring to FIGS. 2 to 4, the operation of the control valve 1 according to the embodiments with respect to position detection and the control valve position detection device will be explained in more detail. In the schematic diagram according to FIG. 2, a graph of the progression of an actuator-characteristic operating variable, generally indicated by the reference sign X and which may be, for example, a driving power, a driving actuating force and/or a driving torque, is shown on the y-axis with respect to an actuating movement of the actuator 15, which actuating movement may be, for example, a rotation angle α in the case of a rotary actuator 15 or a translation movement a in the case of a reciprocating actuator 15. During an actuating movement of the actuator 15, irrespective of whether the actuator 15 is a rotary piston actuator or a reciprocating piston actuator, the actuator 11 applies a predetermined actuating force to set the actuator 15 in motion. The predetermined actuating force can be indicated, for example, by X1 in the diagram according to FIG. 2, wherein a drive power, a drive actuating force and/or a drive torque can correspond or be represented to X1. During an actuating movement (viewed in the x-axis direction to the right) the necessary actuating force of the actuator 11 increases slightly, in particular continuously, indicated by the value X2 with advanced movement along the x-axis, i.e. with increasing stroke movements a or rotational movements a.

The control valve position detection device according to some embodiments, or the control valve 1 makes use of the knowledge of the actuator characteristics. The control valve 1 according to some embodiments or the control valve position detection device is capable of determining a position a or a of the actuator 15 on the basis of the actuator-characteristic operating variable X. For example, at predetermined times, i.e. at predetermined actuator positions of the actuator 15 with respect to the valve housing 13, a short-term, in particular substantially reversible, change of the actuator-characteristic operating variable X can be accomplished. This is indicated in the function graph according to FIG. 2 by reference sign 39.

For example, the short-term increase of the necessary drive power, drive actuating force and/or the necessary drive torque for positioning the actuator 15 can be achieved by generating a sudden increase in frictional resistance at a predetermined actuator position, which acts against the movement of the actuator 15 relative to the valve housing 13, so that the actuator-characteristic operating variable X changes suddenly. In other words, the drive actuating force and/or the drive torque increases significantly for a short time in order to cause further positioning of the actuator 15, i.e. the necessary actuator power, actuator operating force and/or actuator torque increases significantly for a short time in order to cause the actuator 15 to be moved further. Once the short-term frictional resistance has been overcome, the necessary drive power, drive actuating force and/or drive torque, generally indicated by the actuator-characteristic operating variable X, drops again.

In FIG. 2, four predetermined actuator positions are schematically indicated by the reference signs α1//a1/, +2/a2, α3/a3, and α4/a4, at each of which a step-like change 39 of the actuator-characteristic operating variable X is caused. The electronics of the control valve position detection device, which may be, for example, the actuator electronics and/or the control valve electronics, is capable of detecting the change in the actuator-characteristic operating variable and converting it into a position signal of the actuator 15. For example, a threshold X' for the actuator-characteristic operating variable X may be envisaged which the actuator-characteristic operating variable X must at least reach so that a position signal is generated.

With reference to FIGS. 3 and 4, two different actuator positions 15 of a control valve 1 according to the invention are shown, referring to the control valve position detection device according to the embodiments. The multi-way valve, in particular 3/2-way valve, according to FIGS. 3 and 4 comprises, as already mentioned, a valve inlet 3 formed by the fluid inlet port 17 and two fluid outlets 5, 9 formed by the fluid outlet ports 19 and 20 respectively. Any of the detection devices may be referred to as detectors.

In FIG. 3, a fluid channel 7 is open between fluid inlet 3 and fluid outlet 5, while in FIG. 4, a fluid channel 8 is open between fluid inlet 3 and fluid outlet 9. To implement the various flow scenarios, the rotary actuator 15 is rotated about its rotational actuation axis R so that the actuator 15 fluidically connects the fluid inlet 3 to the fluid outlet 5, namely via an alignment of an internal bore 25 for process fluid flow of the actuator 15 to allow process fluid flow through the control valve 1. In FIG. 4, the internal bore 25 is then aligned to fluidically connect the fluid inlet 3 to the fluid outlet 9.

In order to effect the short-term, in particular essentially reversible change in the actuator-characteristic operating variable X, the control valve position detection device or the control valve 1 has means 41 (which may also be referred to as a detector, detectors, or auxilliary) which are designed to produce the change in the actuator-characteristic operating variable X during an actuating movement of the actuator 15, for example by a short-term resistance peak for abruptly increasing the frictional resistance counter to the relative movement between the actuator 15 and the valve housing 13. Referring to FIGS. 3 and 4, the means 41 may be subdivided into valve housing side position detection auxiliary 43 and actuator side position detector 45, which are associated with each other such that in a predetermined position of the actuator 15 with respect to the valve housing 13 they engage with each other, whereby a position signal indicative of the actuator position is generated by the actuator valve position detector.

In one embodiment, a pair of position detection auxiliary 43 are fixedly arranged on a valve body inner side 47. Furthermore, two position detectors 45 are arranged on an actuator outer side 49. The position detection auxiliary 43 and the position detectors 45 project from the inner side 47 and the outer side 49, respectively, so that when the actuator 15 is positioned or moved relative to the valve housing 13, the position detection auxiliary 43 are overrun by the position detector 44, resulting in a sudden increase in the frictional resistance, which is noticeable in the change in the actuator-characteristic operating variable X; see FIG. 2. In this example, the position detector(s) 45 are fixedly, in particular non-rotatably, connected to the actuator 15. A distance between the two position detectors 45 of the actuator 15 considered in the circumferential direction with respect to the rotational actuating axis R corresponds to an angular difference Aa, for example, between α1 and α2 according to FIG. 2. Depending on the rotational position, in the case of a rotary piston actuator 15, resp. according to the axial position of the piston actuator 15, relative to the valve body 13, different position detection auxiliary 43 and position detector(s) 45 engage with each other, so that at different angular or translational positions of the actuator an event occurs which causes the change in the actuator-characteristic operating variable X, such as for example an increased frictional contact. By comparing FIGS. 3 and 4, it can be seen that in FIGS. 3 and 4 different position detectors 45 are in contact with position detection auxiliary 43.

The features disclosed in the foregoing description, figures and claims may be significant, both individually and in any combination, for the realization of the invention in the various embodiments.

REFERENCE LIST 1 control valve
3 fluid inlet
5 fluid outlet
7, 8 fluid channel
9 fluid outlet
11 drive
13 valve body
15 actuator
17, 19, 20 fluid nozzle
21 valve chamber
23 cover
25 bore
27, 29 seal
31, 33 valve seat
35, 37 storage
39 change in actuator-characteristic operating variable
41 medium
43 position detection auxiliary or position detection auxiliary means
45 position detector(s) or position detection means
47 valve housing inner side
49 actuator outer side
X actuator-characteristic operating variable
α control angle
a travel
R rotation actuation axis

The invention claimed is:

1. A control valve position detection device for a control valve, the control valve position detection device comprising:
   a control element configured to be adjusted by a drive;
   electronics configured to:
      cause a short-term change in the actuator-characteristic operating variable, wherein the short-term change is reversible; and
      detect a position of the control element based on the short-term change in the actuator-characteristic operating variable, the actuator-characteristic operating variable comprising a drive power, a drive actuating force, or a drive torque; and
   monitoring electronics configured to: monitor a position of an actuator based on the actuator-characteristic operating variable, and/or diagnose the position of the actuator based on the short-term change in the actuator-characteristic operating variable.

2. The control valve position detection device of claim 1, wherein the electronics are further configured to generate a short-term resistance peak against a relative displacement of the actuator and a valve housing to cause the short-term change in the actuator-characteristic operating variable, the short-term resistance peak being generated by an abrupt increase of frictional resistance, so that the actuator-characteristic operating variable increases abruptly.

3. A directional control valve for adjusting a process fluid flow, comprising:
   at least one fluid channel;
   an actuator configured to close and at least partially open one of the at least one fluid channel;
   a drive coupled to the actuator configured to apply actuating forces;
   a control valve position detection device comprising: a control element configured to be adjusted by the drive; and electronics configured to: (a) cause a short-term change in the actuator-characteristic operating variable, wherein the short-term change is reversible; and (b) detect a position of the control element based on the short-term change in the actuator-characteristic operating variable; and
   a position detector configured to:
      (a) detect a position of the actuator and generate a corresponding position signal; and
      (b) monitor the position of the actuator based on the actuator-characteristic operating variable, and/or diagnose the position of the actuator based on a the short-term change in the actuator-characteristic operating variable.

4. The directional control valve of claim 3, wherein the actuator-characteristic operating variable comprises a drive power, a drive actuating force, or a drive torque.

5. The directional control valve of claim 3, further comprising:
   a valve housing which at least partially bounds the at least one fluid channel and on which a position detection auxiliary is arranged that is configured to cooperate with the position detector, which is assigned to the actuator and is connected in a rotationally fixed manner to the actuator so that the position detector generates the position signal, associated with the actuator, wherein the position detection auxiliary is arranged on a valve seat cooperating with the actuator in order to close and open the fluid channel.

6. The directional control valve of claim 5, wherein a position detection aid and the position detector are arranged and coordinated with each other to engage with each other at a predetermined position of the actuator relative to the valve body, whereby a position signal indicative of the actuator position is generated.

7. The directional control valve of claim 5, wherein the position detection auxiliary and the position detector are configured to form a frictional contact during a movement of the actuator relative to the valve housing, wherein the frictional contact causes a short-term resistance peak against the relative movement including a sudden increase of frictional resistance.

8. The directional control valve of claim 5, wherein the position detection auxiliary is formed by a projection projecting from a valve body inner side, wherein the position detector is formed by a projection projecting from an actuator outer side.

9. The directional control valve of claim 5, wherein the position detection auxiliary is made of a softer material than the position detector, the position detection auxiliary and the position detector being made of plastic.

10. The directional control valve of claim 3, further comprising:
   at least two position detectors arranged at a distance from one another along a direction of movement of the actuator relative to the valve housing, wherein the direction of movement is in the circumferential direction with respect to an axis of rotation or in an axial direction with respect to an axis of translation, further wherein the distance between two adjacent position detectors corresponds to a predetermined increment of movement of the actuator.

* * * * *